(12) United States Patent  (10) Patent No.: US 8,866,758 B2
Schmidt et al.  (45) Date of Patent: Oct. 21, 2014

(54) RESISTIVE TOUCH SCREEN DISPLAYS AND SYSTEMS

(75) Inventors: John F. L. Schmidt, Phoenix, AZ (US); Randy Maner, Albuquerque, NM (US); Steve Grothe, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 366 days.

(21) Appl. No.: 13/033,396

(22) Filed: Feb. 23, 2011

(65) Prior Publication Data

US 2012/0212425 A1  Aug. 23, 2012

(51) Int. Cl.
*G06F 3/041* (2006.01)
*G06F 3/045* (2006.01)
*G06F 3/047* (2006.01)

(52) U.S. Cl.
CPC ................................. *G06F 3/047* (2013.01)
USPC .................. 345/173; 345/174; 178/18.05

(58) Field of Classification Search
USPC .............. 345/168, 169, 173–175; 178/18.05, 178/18.06
See application file for complete search history.

(56) References Cited

U.S. PATENT DOCUMENTS

| 4,017,848 | A | 4/1977 | Tannas, Jr. |
| 4,066,852 | A | 1/1978 | Zenk |
| 4,385,215 | A | 5/1983 | Lemberg |
| 4,549,093 | A | 10/1985 | Severwright |
| 4,594,482 | A | 6/1986 | Saito et al. |
| 4,775,765 | A | 10/1988 | Kimura et al. |
| 4,987,275 | A | 1/1991 | Miller et al. |
| 5,138,119 | A | 8/1992 | Demeo |
| 5,283,558 | A | 2/1994 | Chan |
| 5,872,561 | A | 2/1999 | Figie et al. |
| 6,067,074 | A | 5/2000 | Lueders |
| 6,274,825 | B1 | 8/2001 | Aaltonen et al. |
| 6,509,846 | B1 | 1/2003 | Fujiki |
| 6,809,280 | B2 | 10/2004 | Divigalpitiya et al. |
| 7,034,808 | B2 * | 4/2006 | Sakata et al. .................. 345/173 |
| 7,339,499 | B2 | 3/2008 | Khlat |
| 7,742,040 | B2 | 6/2010 | Jamieson et al. |
| 2010/0141598 | A1 | 6/2010 | Yamaucki et al. |
| 2010/0265205 | A1 * | 10/2010 | Park et al. ..................... 345/174 |

OTHER PUBLICATIONS

Machine English Translation for JP Publication No. 2008-122913, Oct. 7, 2012.*

* cited by examiner

*Primary Examiner* — Jimmy H Nguyen
(74) *Attorney, Agent, or Firm* — Ingrassia Fisher & Lorenz, P.C.

(57) ABSTRACT

A touch screen display and touch screen system is provided. The display and system include a rigid substrate having a top face, a plurality of parallel conductive scan lines located on the top face of the rigid substrate, a plurality of parallel conductive sense lines located on the top face of the rigid substrate, a plurality of dielectric pads located at junctions of the plurality of scan lines and plurality of sense lines electrically isolating the plurality of scan lines from the plurality of sense lines, a flexible substrate having a bottom face oriented above the top face of the rigid substrate and a plurality of conductive features located on the bottom face of the flexible substrate and electrically isolated from each other.

11 Claims, 9 Drawing Sheets

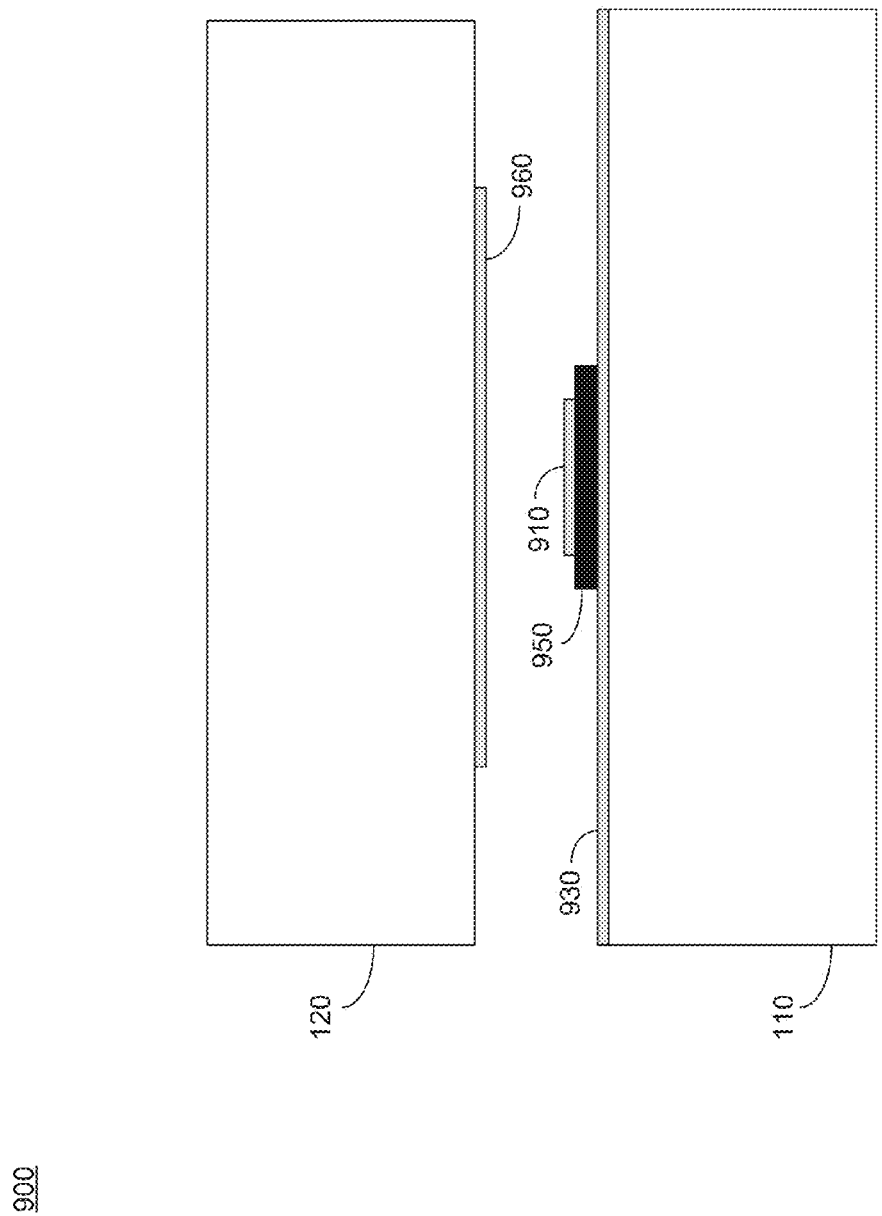

RESISTIVE TOUCH SCREEN DISPLAYS AND SYSTEMS

TECHNICAL FIELD

The following relates to touch screen enabled displays and systems, and more particularly relates to touch screen displays and systems with improved reliability and lifespan.

BACKGROUND

Touch screens are increasingly being found in all manner of residential and commercial display products. There are several touch screen technologies: analog resistive, digital resistive, substrate capacitive, and projective capacitive and many others. Each technology has its advantages and disadvantages with respect to the competing technologies. Resistive touch screens enjoy the widest latitude for activation method. They can be operated with fingers, a stylus, fingernails, gloved hands, or any object that can apply sufficient pressure to activate the touch substrate. In contrast, projected capacitive touch screens enjoy virtually infinite life, but they can only be activated with a finger, or other conductive object. They do not work well with a generic stylus, and they do not work with all types of gloves. This makes them difficult to use in extremely cold environments, or environments where the operator is wearing gloves. Infra-red touch screens solve the lifetime problem of resistive touch screens, and can be used with gloved hands, or a stylus. However, they can be inadvertently activated by objects passing within the infra-red beam array. For example, if a pencil is held a bit too closely to the display substrate, the infra-red touch panel may record a press event. This foreign object activation is commonly referred to as "fly on the screen" activation and can be problematic in critical control applications for touch screens such as avionic control systems. Projective capacitive, surface capacitive and infrared touch screens require no activation force to enable or select an item with the touch screen, where the resistive type touch screens can be tuned to achieve a particular activation force. The requirement for an activation force is an advantage for the resistive touch screen in critical control applications because the activation force helps to preclude unintended touches by a user.

However, current resistive touch screens typically offer the shortest life span compared to other touch screen technologies. In conventional matrix resistive touch screens, a bottom substrate contains one set of conductive traces and a flexible top substrate contains an array of conductive traces whose orientation is orthogonal with respect to the bottom substrate's conductors. When the top substrate is pressed, the traces of the top substrate are electrically shorted to the traces of the bottom substrate. A controller determines an X-Y position, based on the characteristics of the shorted conductors. However, the top array of conductors is flexed and stretched over repeated pressing of the top substrate and can be damaged over time. The repetitive flexing induces stress cracks in the conductive traces, and eventually causes failure of the touch panel at the cracked locations.

DESCRIPTION OF THE DRAWING FIGURES

Exemplary embodiments will hereinafter be described in conjunction with the following drawing figures, wherein like numerals denote like elements.

FIG. 9 is a cross section of a junction of an exemplary touch screen system in accordance with an embodiment.

DETAILED DESCRIPTION OF THE EMBODIMENTS

According to various exemplary embodiments, resistive-type touch screen displays and systems are provided. As discussed in greater detail below, the touch screen may include, but is not limited to, a rigid lower substrate having a top face, a plurality of parallel conductive scan lines located on the top face of the rigid substrate, a plurality of parallel conductive sense lines located on the top face of the rigid substrate, a plurality of dielectric pads located at junctions of the plurality of scan lines and plurality of sense lines, which electrically isolates the plurality of scan lines from the plurality of sense lines, a flexible substrate having a bottom face oriented above the top face of the rigid substrate, and an array of conductive features located on the bottom face of the flexible substrate, wherein when the flexible substrate is flexed, at least one of the conductive features completes a conductive pathway between one of the plurality of conductive scan lines and one of the plurality of conductive sense lines.

Because the touch screen places both the scan lines and sense lines on the rigid substrate and uses a plurality of electrically isolated conductive features on the upper flexible substrate, the touch screen has improved reliability and lifespan when compared to traditional resistive-type touch screens, as discussed in further detail below.

Figure 1:
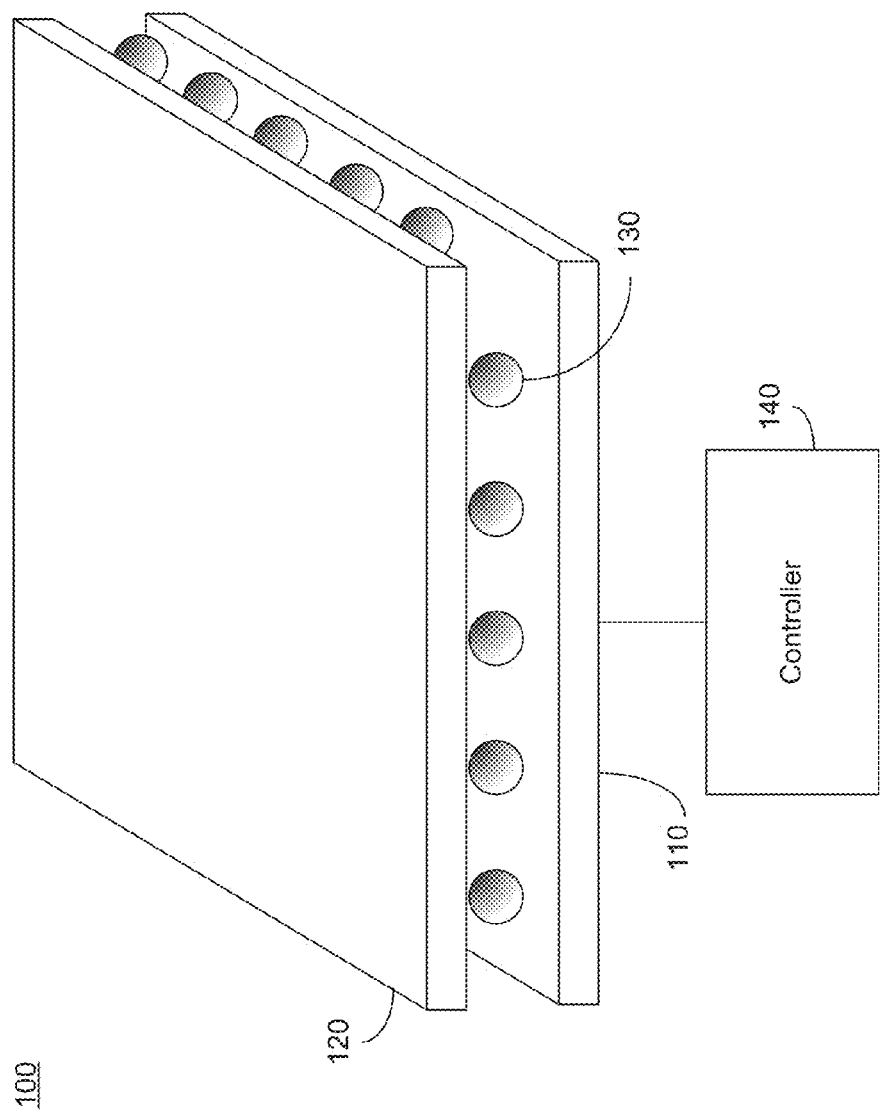
FIG. 1 is an exemplary touch screen system in accordance with an embodiment.

FIG. 1 illustrates an exemplary matrix resistive touch screen 100 in accordance with an embodiment. The touch screen includes a rigid substrate 110 and a flexible substrate 120. The rigid substrate 110 can be made, for example, of glass or plastic. The flexible substrate 120 can be made from, for example, a glass, plastic or film. The touch screen 100 also includes a plurality of spacers 130 which keep the rigid substrate no and flexible substrate 120 separate absent any applied force from a user. The spacers could be cylindrical posts or dielectric flexible rigid spheres whose size and distribution across the touch surface ensure spacing between the two substrates, and also help control the touch activation force. The spacers can be uniformly distributed across the touch panel's surface area to ensure consistent gap thickness between the touch panel's upper and lower surfaces. The spacer size should be sufficiently small so as to preclude optical artifacts from appearing on the display surface. The refractive index of the spacer materials is selected to minimize their visibility. The touch screen 100 further includes a controller 140 to control the touch screen electronics, as discussed in further detail below.

Figure 2:
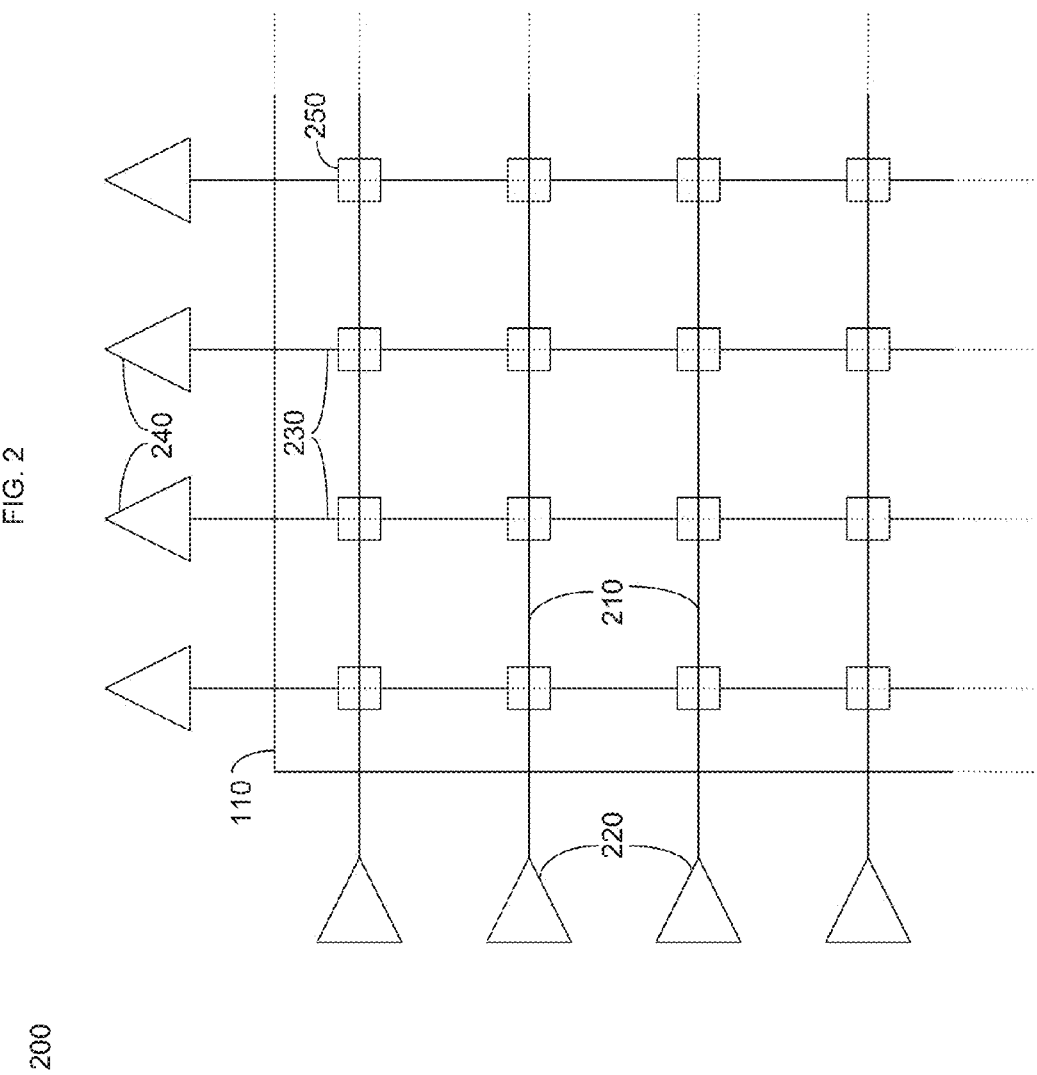
FIG. 2 is an exemplary rigid substrate for a touch screen system in accordance with an embodiment.

FIG. 2 illustrates an exemplary rigid substrate no for a touch screen 200 in accordance with an embodiment. The rigid substrate no includes a plurality scan lines 210 attached thereto, for example, via photolithographic printing or direct printing. A perimeter bond of adhesive outside of the useable area of the touch screen may be used to attach the rigid substrate 110 to the flexible substrate 120. Scanning and sensing may employ analog location detection wherein the relative touch position is sensed as a measured fractional voltage of the applied scan voltage, or digital location detection may be employed wherein the presence of a signal exceeding some threshold value at a scan/sense grid point implies a touch event at that point, and a signal below the threshold value implies that no touch event has occurred at that point. The conductive scan lines 210 and sense lines 230 can be constructed of fixed resistance conductors for analog sensing, or they may be constructed of highly conductive zinc oxide, aluminum oxide, carbon nano-tubes, or microwires for digital touch sensing. The scan lines 210 may be made from any conductive material. In one embodiment, for example, the scan lines 210 may be made from indium tin oxide ("ITO"). In other embodiments, the scan lines 210 cab be made from zinc oxide, aluminum oxide, carbon nanotubes, conductive inks, micro wires or any combination thereof. Each of the scan lines 210 is connected to a corresponding scan driver 220. The scan drivers 220 place a predetermined excitation signal across its respective scan line 210, as discussed in further detail below. In one embodiment, for example, only a single scan driver 220 may actively place the excitation signal along its respective scan line 210 at a time. The scan drivers 220, for example, may sequentially place the excitation signal across their respective scan lines 210 from the top of the touch screen 200 to the bottom, from the bottom to the top or in any other arranged or random order.

The rigid substrate 110 also includes a plurality of sense lines 230. The sense lines 230 may be made from any conductive material. In one embodiment, for example, the sense lines 230 may be made from ITO. In other embodiments, the scan lines 210 cab be made from zinc oxide, aluminum oxide, carbon nanotubes, conductive inks, micro wires or any combination thereof. Each of the sense lines 230 is connected to a corresponding sense amplifier 240. Each sense amplifier 240 is capable of monitoring for the predetermined excitation signal output by the scan drivers 220, as discussed in further detail below.

The scan lines 210 and sense lines 230 are electrically isolated from each other by dielectric pads 250. While FIG. 2 illustrates the scan line 210 being placed above the dielectric pad 250 and the sense lines 230 being placed below the dielectric pad 250, their respective positions can be reversed. Further, while the embodiment illustrated in FIG. 2 illustrates the scan lines 210 running horizontally and the sense lines 230 running vertically, their respective orientations, along with the corresponding scan drivers 220 and sense amplifiers 240, can be reversed. Further, while the scan lines 210 and sense lines 230 are each arranged in parallel and perpendicular with respect to each other, other configurations may be used, as discussed in further detail below. For example, the scan lines 210 can be oriented at an angle other than 90° with respect to the sense lines 230. Angling the scan lines 210 with respect to the sense lines 230, or angling the entire array of scan and sense lines may reduce optical interference effects, such as moiré, on the display.

Figure 3:
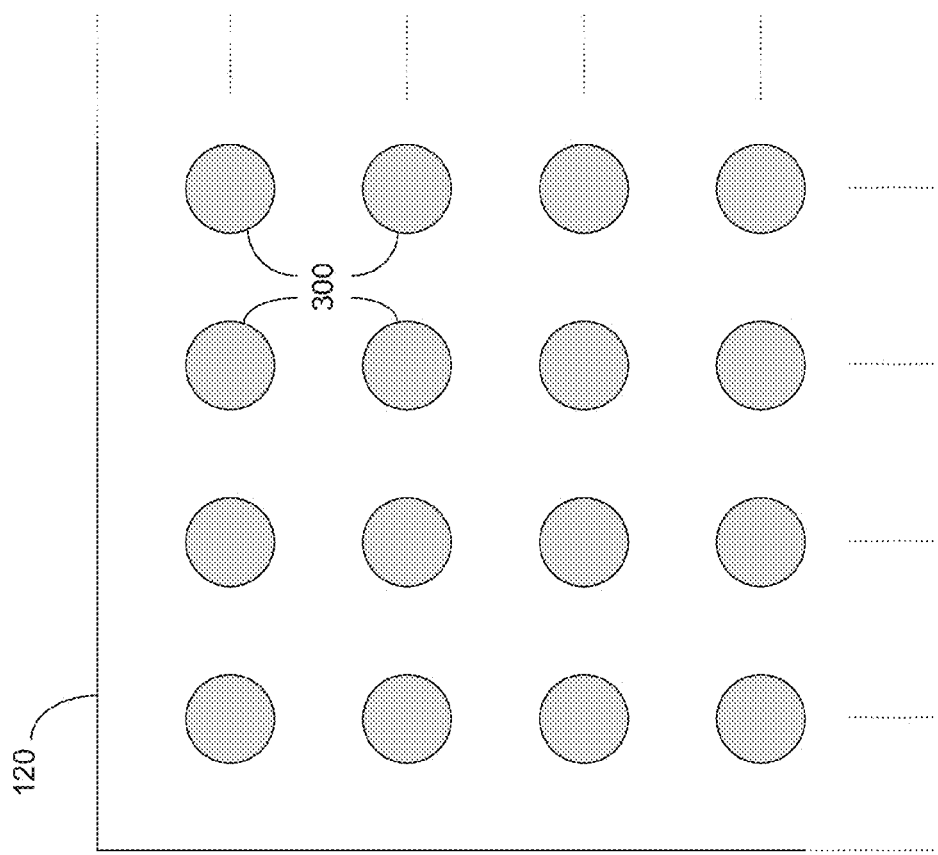
FIG. 3 is another exemplary flexible substrate for a touch screen system in accordance with an embodiment.

FIG. 3 illustrates an exemplary flexible substrate 120 in accordance with an embodiment. The flexible substrate 120 includes a plurality of electrically conductive features 300 which are mounted thereon. Each of the conductive features 300 are electrically isolated from each other. The conductive features 300 can be made from any conductive material. In one embodiment, for example, the conductive features 300 may be made from ITO. Similar to the scan lines 210 and sense lines 230, the conductive features 300 could also be made of Zinc oxide, Aluminum oxide, carbon nanotubes, conductive inks, micro wires or any combination thereof. In one embodiment, for example, the scan and sense lines can be made of ITO while the conductive features 300 could be made of conductive carbon nanotube films. The conductive features 300 may be arranged along the flexible substrate 120 in a pattern corresponding to where the scan lines 210 and sense lines 230 cross or form a junction, as discussed in further detail below.

Because the flexible substrate 120 uses a plurality of conductive features 300, rather than a solid sheet of conductive material, the touch screen is more likely to have a longer lifespan. For example, a touch screen which employs the conductive features 300 would experience small mechanical stress over the feature size when the touch panel is activated, and the underlying substrate is deformed by contact pressure. The small mechanical stress applied to the individual conductive features enables them to provide long life cycles, compared to the continuous conductive sheets and traces employed in the prior touch panels. A solid conductor sheet style touch screen has more of a tendency to break down after time because the solid conductive sheets may crack after repeated flexing, similar to the typical matrix resistive-type touch screen display that mounts either the scan lines or sense lines along a flexible top substrate.

The conductive features 300 may be of any of a variety of shapes. Some non-limiting examples of conductive feature shapes are, circles, ovals, squares, stars, pluses and crosses. However, any shape may be used. The dimensions of the conductive features 300 may depend upon the dimensions of the dielectric pad 250, the flexibility of the flexible substrate 120 and the density of desired active touch positions. Any combination of feature shapes and arrangements can be used with both the analog-type drive and the digital-type drive of the scan and sense array.

Figure 4:
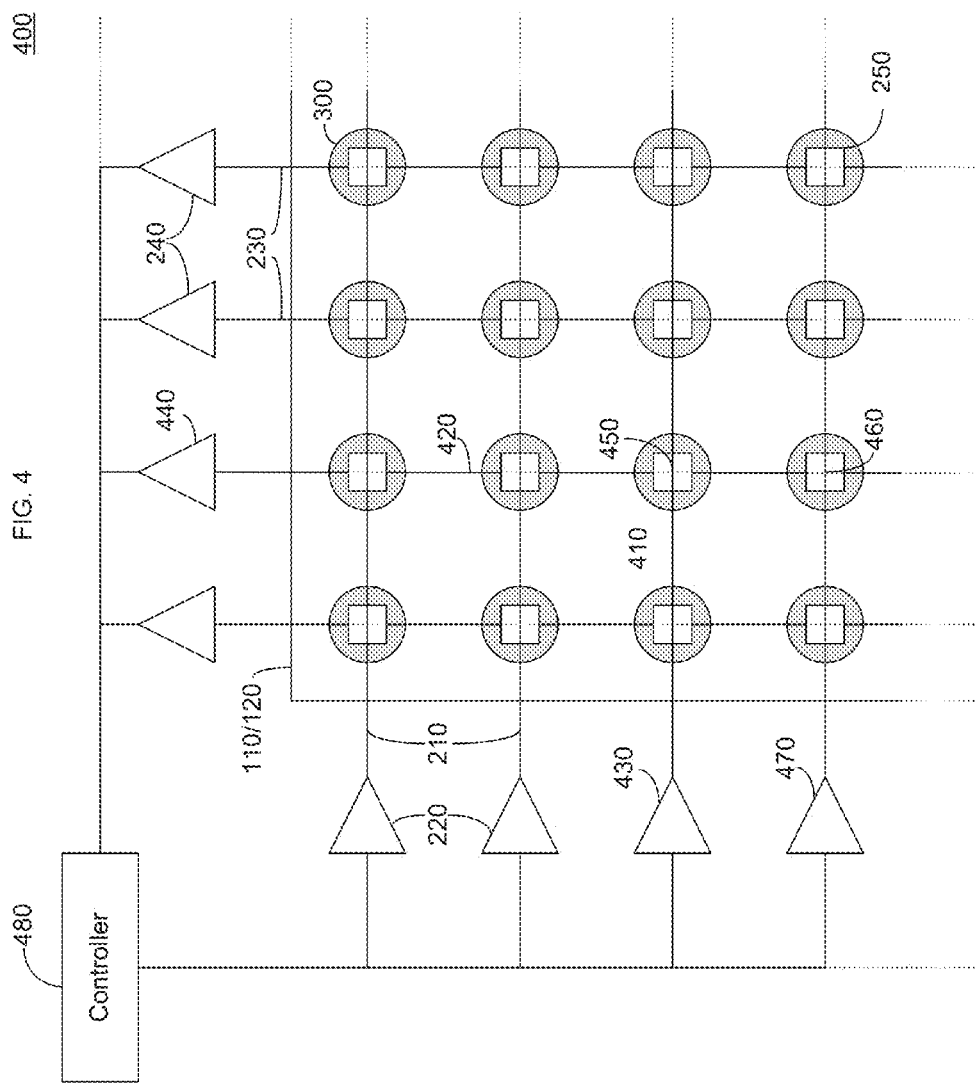
FIG. 4 is another exemplary touch screen system in accordance with an embodiment.

FIG. 4 illustrates how the rigid substrate 110 and flexible substrate 120 interact in accordance with one embodiment for an exemplary touch screen 400. When the flexible substrate 120 is depressed, a conductive feature 300 contacts a scan line 210 and sense line 230, and a conductive path is created between a scan driver 220 and a sense amplifier 240. For example, if the feature 300 at junction 450 comes into contact with the corresponding scan line 410 and sense line 420, a conductive path is created between scan driver 430 and sense amplifier 440. As seen in FIG. 4, because each conductive feature 300 extends beyond the corresponding dielectric pad 250, the conductive feature 300 can come into contact with the sense lines 230 (which are positioned below the dielectric pad 250 in this embodiment) as the flexible substrate is depressed by a user. The dimensions of the conductive feature 300 can vary depending upon the size of the dielectric pad 250, the size and density of the spacer dots/posts and the flexibility of the flexible substrate 120. For example, the conductive features 300 may be reduced in size when the flexible substrate 120 is very flexible and/or when the dielectric pad 250 has a relatively small size, and also when a higher density touch position design is desired. In contrast, if the flexible substrate 120 is less flexible and/or the dielectric pad 250 has a relatively large size, the conductive features 300 may be made larger.

The controller 480, based upon whichever sense amplifier 240 received the excitation signal, can determine the location of the touch input based upon the voltage sensed by the corresponding sense amplifier 240. For example, if the touch was at junction 450, the amount of resistance due to the length of material from scan driver 430 to sense amplifier 440 would be less than, for example, the amount of resistance due to the length of material from scan driver 470 to sense amplifier 440 if the touch was at junction 460. Accordingly, the voltage received by the sense amplifier 440 would differ for each junction between the scan lines 210 and sense lines 230 for a given sense amplifier 240. In another embodiment, when the scan drivers 220 place the predetermined excitation along their respective scan lines 210 one at a time, the controller 480 can determine the position of the touch based upon which scan driver 220 was active when a respective sense amplifier 240 receives an excitation signal. This configuration would allow for the touch screen 400 to be a multi-touch screen since the controller 480 could detect multiple touches along the same sense line 240.

Figure 5:
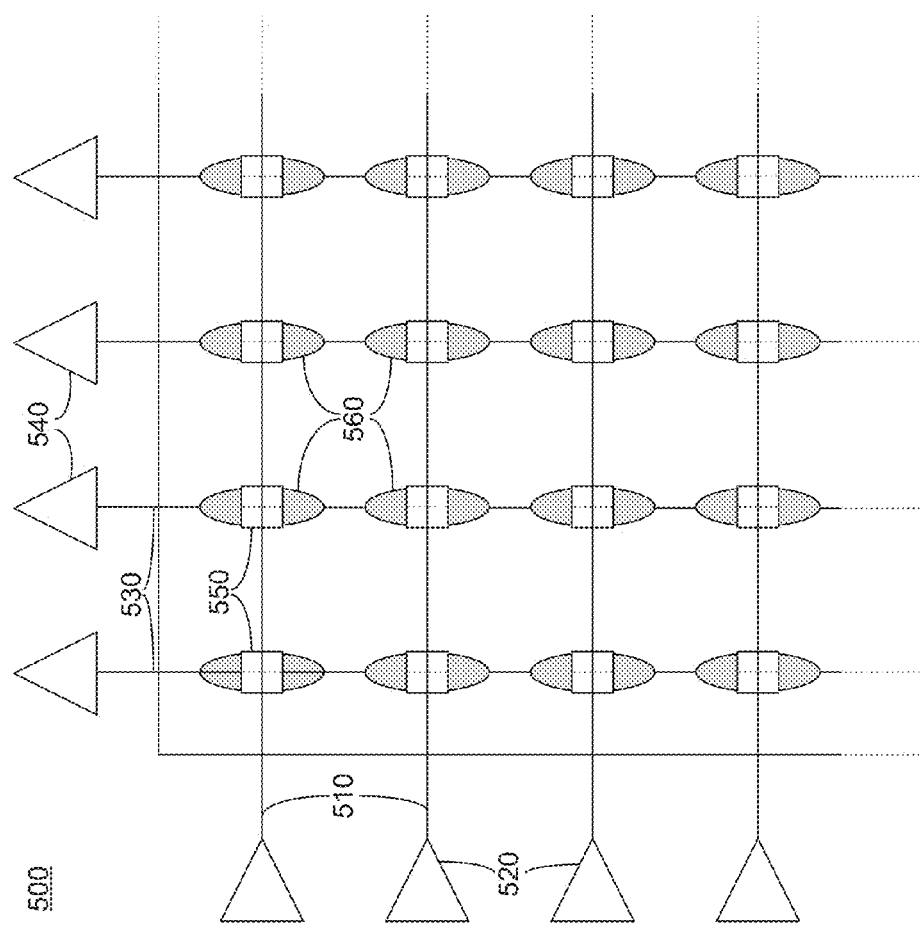
FIG. 5 is yet another exemplary touch screen system in accordance with an embodiment.

FIG. 5 illustrates another exemplary touch screen 500 system in accordance with an embodiment. The touch screen 500 includes a plurality of scan lines 510 on a rigid substrate and connected to scan drivers 520. The touch screen 500 further includes a plurality of sense lines 530 on the rigid substrate and connected to sense amplifiers 540 and a plurality of dielectric pads 550 electrically isolating the scan lines 510 from the sense lines 530. The touch screen also includes a plurality of conductive features 560 on a flexible substrate. It should be noted that the conductive features 560 are continuous (i.e., a single piece) and that they are merely displayed behind the scan lines 510, sense lines 530 and dielectric pads 550 to illustrate how each of the elements interact. As seen in FIG. 5, the conductive features 560 are oval in shape. The features 560 extends in the direction of the conductor (the sense line 530 in this example) which is beneath the dielectric pad 550. The extension of the feature 560 along the sense line 530 increases the area where a conductive path between a given scan driver and sense amplifier will be created.

Figure 6:
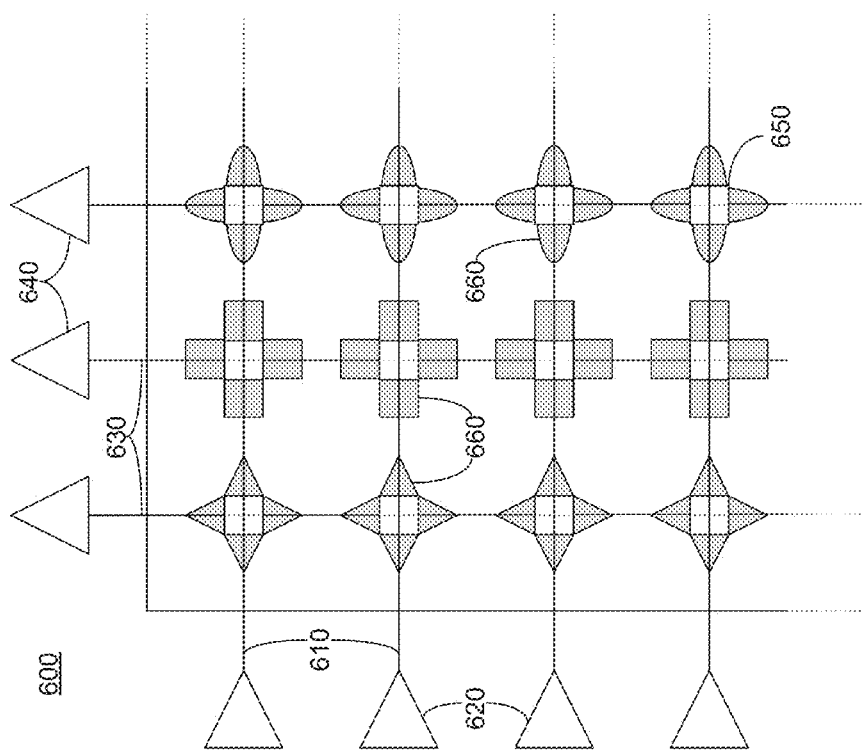
FIG. 6 is yet another exemplary touch screen system in accordance with an embodiment.

FIG. 6 illustrates yet another exemplary touch screen system 600, in accordance with an embodiment. The touch screen 600 includes a plurality of scan lines 610 on a rigid surface connected to corresponding scan drivers 620. The touch screen further includes a plurality of sense lines 630 on the rigid surface connected to sense amplifiers 640. The touch screen 600 also includes a plurality of dielectric pads 650 where the scan lines 610 and sense lines 630 junction, electrically isolating the scan lines 610 from the sense lines 630. Similar to the embodiments described above, the touch screen 600 also includes a plurality of conductive features 660 mounted onto a flexible substrate (not illustrated). It should be noted that the conductive features 660 are continuous (i.e., a single piece) and that they are merely displayed behind the scan lines 610, sense lines 630 and dielectric pads 650 to illustrate how each of the elements interact. When the flexible substrate is depressed, the conductive features 660 contacts both the scan lines 610 and sense lines 630 and creates a conductive path between at least one scan line 610 and corresponding scan driver 620 and a sense lines 630 and a corresponding sense amplifier 640. In contrast to the conductive features 660 illustrated in FIG. 5, the conductive features 660 illustrated in FIG. 6 are oriented along both the scan lines 610 and sense lines 630, which may provide for greater reliability because of the increased area available to make electrical contact. The embodiment illustrated in FIG. 6 illustrates several examples of different shaped conductive features 660 which extend over both the scan lines 610 and sense lines 630. FIG. 6 illustrates a conductive substrate 660 shaped like a four pointed star, as a plus sign (i.e., two overlapping rectangles) and as two overlapping ovals, however, other shapes may be used. Further, while in the embodiment illustrated in FIG. 6, three different shaped conductive features 660 are illustrated, any combination of different substrate shapes may be used. Furthermore, in other embodiments different sized conductive features having the same shape may be implemented on the same touch screen.

Figure 7:
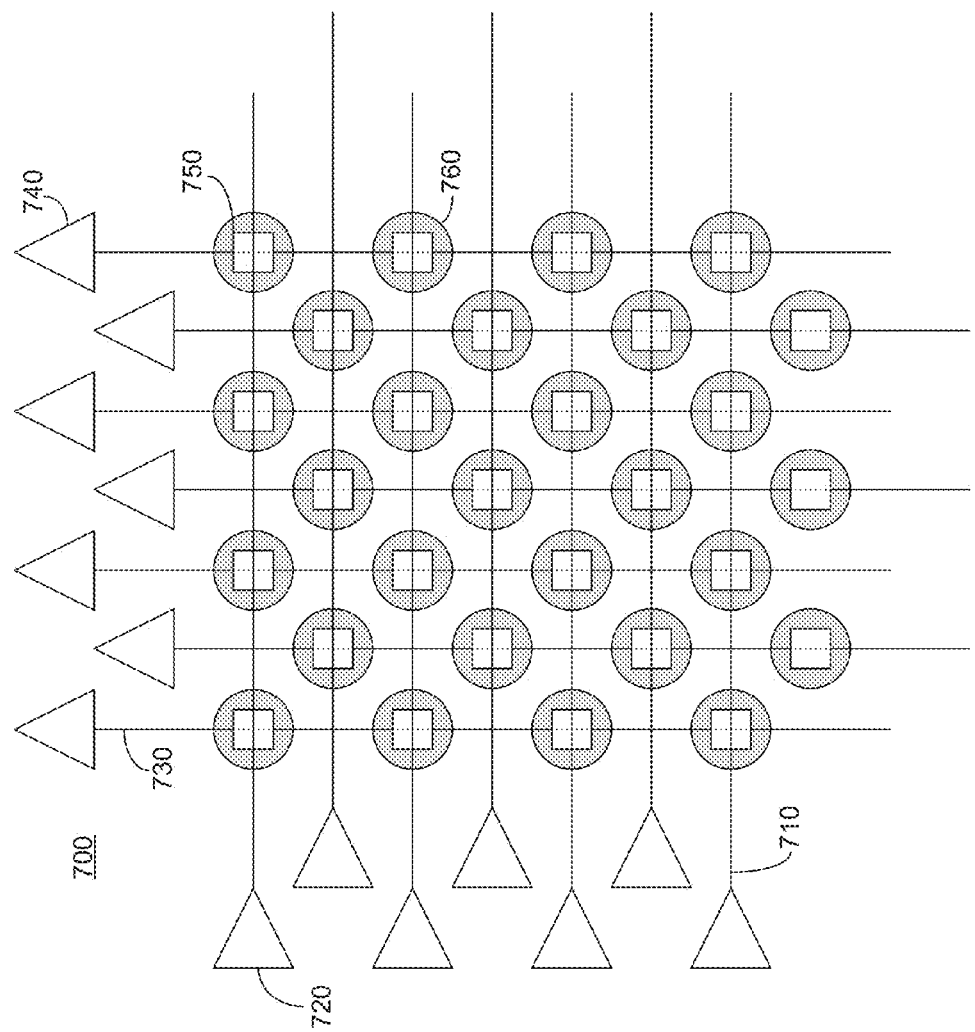
FIG. 7 is yet another exemplary touch screen system in accordance with an embodiment.

FIG. 7 illustrates yet another exemplary touch screen system 700, in accordance with an embodiment. The touch screen 700 includes a plurality of scan lines 710 on a rigid surface connected to corresponding scan drivers 720. The touch screen further includes a plurality of sense lines 730 on the rigid surface connected to sense amplifiers 740. The touch screen 700 also includes a plurality of dielectric pads 750 where the scan lines 710 and sense lines 730 junction, electrically isolating the scan lines 710 from the sense lines 730. Similar to the embodiments described above, the touch screen 700 also includes a plurality of conductive features 760 mounted onto a flexible substrate (not illustrated). It should be noted that the conductive features 760 are continuous (i.e., a single piece) and that they are merely displayed behind the scan lines 710, sense lines 730 and dielectric pads 750 to illustrate how each of the elements interact. When the flexible substrate is depressed, the conductive features 760 contacts both the scan lines 710 and sense lines 730 and creates a conductive path between at least one scan line 710 and corresponding scan driver 720 and a sense lines 730 and a corresponding sense amplifier 740. In this embodiment, the scan lines 710 and sense lines 730 are perpendicular with respect to each other, however, the junctions where the scan lines 710 and sense lines 730 junction are staggered, allowing for more junctions in a given space. For example, in the embodiment illustrated in FIG. 7, for any two adjacent columns of sense lines 730 the junctions where the conductive surfaces are positioned along sense lines 730 are at different latitudes. One benefit of the embodiment, for example, is that the larger number of junctions between scan lines 710 and sense lines 730 increases the touch-sense resolution of the touch screen. Furthermore, the additional junctions could increase the reliability and lifespan of the touch screen 700.

Figure 8:
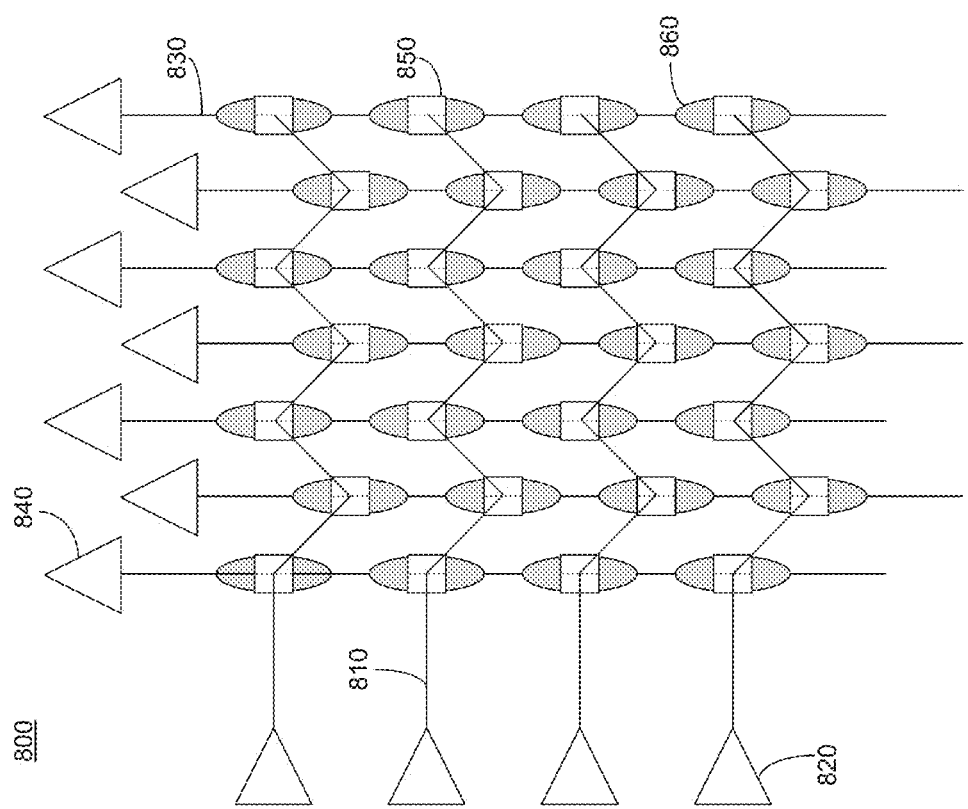
FIG. 8 is yet another exemplary touch screen system in accordance with an embodiment.

FIG. 8 illustrates yet another exemplary touch screen system 800, in accordance with an embodiment. The touch screen 800 includes a plurality of scan lines 810 on a rigid surface connected to corresponding scan drivers 820. The touch screen further includes a plurality of sense lines 830 on the rigid surface connected to sense amplifiers 840. The touch screen 800 also includes a plurality of dielectric pads 850 where the scan lines 810 and sense lines 830 junction, electrically isolating the scan lines 810 from the sense lines 830. Similar to the embodiments described above, the touch screen 800 also includes a plurality of conductive features 860 mounted onto a flexible substrate (not illustrated). It should be noted that the conductive features 860 are continuous (i.e., a single piece) and that they are merely displayed behind the scan lines 810, sense lines 830 and dielectric pads 850 to illustrate how each of the elements interact. When the flexible substrate is depressed, the conductive features 860 contacts both the scan lines 810 and sense lines 830 and creates a conductive path between at least one scan line 810 and corresponding scan driver 820 and a sense lines 830 and a corresponding sense amplifier 840. In this embodiment, the junctions between the scan lines 810 and sense lines 830 are staggered, similar to those in FIG. 7. However, while the sense lines 830 are configured vertically, the scan lines 810 angularly undulate (e.g., zigzag) between adjacent rows of junctions. In other embodiments, for example, the scan lines 810 may angularly undulate between three or more rows of junctions. In yet another embodiment, for example, the sense lines 830 may angularly undulate across multiple rows or junctions, reducing the number of sense amplifiers 840 required by the system. In another embodiment, for example, both the scan lines 810 and sense lines 830 may angularly undulate.

By angularly undulating the scan lines 810 across multiple rows of junctions, the touch screen may have improved touch-sensing resolution while reducing the number of scan drivers 820 required to place the excitation signals across all of the scan lines. For example, when compared to the configuration in FIG. 7, the embodiment illustrated in FIG. 8 may be implemented with half as many scan drivers. The configuration may be useful, for example, in high resolution wide aspect ratio displays in which fewer rows are needed.

FIG. 9 is a cross section of a junction of an exemplary touch screen system 900 in accordance with an embodiment. The junction includes a scan lines 910 and a sense lines 930 positioned on a rigid surface 110. The junction also includes a dielectric pads 950 where the scan lines 910 and sense lines 930 cross, electrically isolating the scan line 910 from the sense line 930. The junction also includes a conductive features 960 mounted onto a flexible substrate 120. When the flexible substrate 120 is depressed, the conductive features 960 contacts both the scan line 910 and sense lines 930 and creates a conductive path between the scan line 910 and corresponding scan driver and the sense lines 930 and a corresponding sense amplifier.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A touch screen, comprising:
   a rigid substrate having a top face;
   a plurality of parallel conductive scan lines located on the top face of the rigid substrate;
   a plurality of parallel conductive sense lines located on the top face of the rigid substrate;
   a plurality of junctions where the conductive scan lines and the conductive sense lines cross, wherein the plurality of junctions are arranged in a staggered pattern and wherein, for any two adjacent columns of said sense lines, all junctions of said plurality of junctions positioned on one column of said any two adjacent columns of said sense lines are at different latitudes from all junctions of said plurality of junctions positioned on another column of said any two adjacent columns of said sense lines;
   a plurality of dielectric pads located only at said junctions of the plurality of scan lines and plurality of sense lines electrically isolating the plurality of scan lines from the plurality of sense lines;
   a flexible substrate having a bottom face oriented above the top face of the rigid substrate; and
   a plurality of conductive features, each located only at each of said junctions on the bottom face of the flexible substrate and electrically isolated from each other,
   wherein the plurality of conductive features are arranged such that when the flexible substrate is flexed at least one of the conductive features completes a conductive pathway between one of the plurality of conductive scan lines and one of the plurality of conductive sense lines.

2. The touch screen display of claim 1, wherein the conductive features are circular.

3. The touch screen display of claim 1, wherein the conductive features are oval, wherein a major axis of each oval conductive feature is oriented along one of the plurality of parallel conductive scan lines or the plurality of parallel conductive sense lines.

4. The touch screen display of claim 1, wherein the conductive features are oriented along the sense lines.

5. The touch screen display of claim 4, wherein the conductive features are oriented along the scan lines.

6. The touch screen display of claim 1, wherein the plurality of parallel conductive scan lines are perpendicular to the plurality of parallel conductive sense lines.

7. The touch screen display of claim 1, wherein the plurality of parallel conductive scan lines are angled with respect to the plurality of parallel conductive sense lines.

8. The touch screen display of claim 1, wherein the plurality of parallel conductive scan lines angularly undulate between the junctions.

9. The touch screen display of claim 1, further comprising:
   a plurality of scan drivers, each of the scan drivers connected to one of the plurality of parallel conductive scan lines, and configured to place a predetermined excitation signal on a corresponding scan line; and
   a plurality of sense amplifiers, each of the sense amplifiers connected to one of the plurality of parallel conductive sense lines, and configured to monitor for the predetermined excitation signal.

10. The touch screen display of claim 9, further comprising:
    a controller configured to control the plurality of scan drivers and plurality of sense amplifiers,
    wherein the controller is configured to control the plurality of sense drivers such that only a single scan driver is applying the predetermined excitation signal to a corresponding scan line at any time.

11. A touch screen, comprising:
    a rigid substrate having a top face;
    a plurality of parallel conductive scan lines located on the top face of the rigid substrate;
    a plurality of parallel conductive sense lines located on the top face of the rigid substrate;
    a plurality of junctions where said conductive scan lines and said conductive sense lines cross, wherein said plurality of junctions are arranged in a staggered pattern and wherein, for any two adjacent columns of said sense lines, all junctions of said plurality of junctions positioned on one column of said any two adjacent columns of said sense lines are at different latitudes from all junctions of said plurality of junctions positioned on another column of said any two adjacent columns of said sense lines;
    a plurality of dielectric pads, each included in each of said plurality of junctions of the plurality of scan lines and plurality of sense lines electrically isolating the plurality of scan lines from the plurality of sense lines;
    a flexible substrate having a bottom face oriented above the top face of the rigid substrate; and
    a plurality of conductive features arranged in said staggered pattern on the bottom face of the flexible substrate and electrically isolated from each other, wherein each of said plurality of conductive features is included in each of said plurality of junctions and
wherein the plurality of conductive features are arranged such that when the flexible substrate is flexed at least one of the conductive features completes a conductive pathway between one of the plurality of conductive scan lines and one of the plurality of conductive sense lines.

* * * * *